(12) United States Patent
Tjahjono et al.

(10) Patent No.: US 10,637,856 B2
(45) Date of Patent: Apr. 28, 2020

(54) WIRELESS ROUTER DEPLOYMENT

(71) Applicant: ABB Schweiz AG, Baden (CH)

(72) Inventors: Danu Tjahjono, Dublin, CA (US); Sunil Assao, Fremont, CA (US); Rafiq Shaikh, Santa Clara, CA (US)

(73) Assignee: ABB Power Grids Switzerland AG, Baden (CH)

( * ) Notice: Subject to any disclaimer, the term of this patent is extended or adjusted under 35 U.S.C. 154(b) by 218 days.

(21) Appl. No.: 15/838,734

(22) Filed: Dec. 12, 2017

(65) Prior Publication Data

US 2019/0182243 A1   Jun. 13, 2019

(51) Int. Cl.
| | |
|---|---|
| *H04L 29/06* | (2006.01) |
| *H04W 12/06* | (2009.01) |
| *H04W 12/04* | (2009.01) |
| *H04W 84/22* | (2009.01) |
| *H04W 88/08* | (2009.01) |
| *H04W 12/00* | (2009.01) |
| H04W 76/10 | (2018.01) |

(52) U.S. Cl.
CPC ...... *H04L 63/0876* (2013.01); *H04L 63/0892* (2013.01); *H04L 63/108* (2013.01); *H04W 12/009* (2019.01); *H04W 12/04031* (2019.01); *H04W 12/06* (2013.01); *H04W 12/0609* (2019.01); *H04W 84/22* (2013.01); *H04W 88/08* (2013.01); *H04W 12/04* (2013.01); *H04W 76/10* (2018.02)

(58) Field of Classification Search
CPC ............... H04L 63/0876; H04L 63/108; H04L 63/0892; H04W 12/06; H04W 76/10; H04W 12/04; H04W 84/22; H04W 88/08; H04W 12/0609; H04W 12/04031; H04W 12/009

See application file for complete search history.

(56) References Cited

U.S. PATENT DOCUMENTS

| | | | |
|---|---|---|---|
| 7,334,125 B1 * | 2/2008 | Pellacuru | H04L 9/083 380/277 |
| 7,420,933 B2 * | 9/2008 | Booth, III | H04L 12/4641 370/254 |
| 8,438,618 B2 * | 5/2013 | Eldar | H04L 41/0869 726/5 |

(Continued)

*Primary Examiner* — Chau Le
*Assistant Examiner* — Hany S. Gadalla
(74) *Attorney, Agent, or Firm* — Brian R. Short (57) ABSTRACT

Systems, methods, and apparatuses for deploying a wireless router are disclosed. One method includes accessing, by the wireless router, default credentials, checking, by the wireless router, access to a backhaul link to an upstream network, authenticating, by the wireless router, using the default credentials, procuring, by the wireless router, a customer certificate of a customer, authenticating, by the wireless router, with an authentication server using the customer certificate, procuring, by the wireless router, from a management server, a customer specific wireless mesh configuration after being authenticated by the authentication server, rebooting, by the wireless router, using the customer specific wireless mesh configuration, thereby allowing the wireless router to operate within a wireless mesh network, and broadcasting, by the wireless router, service set identifiers (SSIDs) derived from the default credentials.

17 Claims, 7 Drawing Sheets

(56) References Cited

U.S. PATENT DOCUMENTS

| | | | | |
|---|---|---|---|---|
| 8,634,342 | B2* | 1/2014 | Rahman | H04L 67/34 |
| | | | | 370/328 |
| 9,325,575 | B2* | 4/2016 | Gray | H04L 41/0846 |
| 9,515,875 | B2* | 12/2016 | Baugher | H04L 41/0806 |
| 9,615,224 | B2* | 4/2017 | Dumov | H04W 4/12 |
| 10,447,683 | B1* | 10/2019 | Loladia | H04W 12/00503 |
| 2003/0233580 | A1* | 12/2003 | Keeler | G06Q 20/206 |
| | | | | 726/7 |
| 2008/0112363 | A1* | 5/2008 | Rahman | H04W 8/005 |
| | | | | 370/331 |
| 2009/0013210 | A1* | 1/2009 | McIntosh | H04L 41/0672 |
| | | | | 714/4.1 |
| 2010/0306352 | A1* | 12/2010 | Pritikin | H04L 41/0806 |
| | | | | 709/221 |
| 2013/0318343 | A1* | 11/2013 | Bjarnason | H04L 41/0809 |
| | | | | 713/157 |
| 2014/0359127 | A1* | 12/2014 | Linares | H04L 41/0816 |
| | | | | 709/226 |
| 2015/0052349 | A1* | 2/2015 | Gero | H04L 9/0891 |
| | | | | 713/153 |
| 2015/0244708 | A1* | 8/2015 | Ballard | H04L 63/0823 |
| | | | | 726/6 |
| 2016/0306949 | A1* | 10/2016 | Tallapaneni | G06F 21/10 |
| 2017/0251505 | A1* | 8/2017 | Bhatnagar | H04W 4/00 |
| 2017/0272317 | A1* | 9/2017 | Singla | H04L 41/0806 |
| 2018/0063714 | A1* | 3/2018 | Stephenson | H04W 12/06 |
| 2018/0139192 | A1* | 5/2018 | Pishinov | H04L 63/0815 |
| 2018/0316673 | A1* | 11/2018 | Shah | H04L 63/0892 |
| 2019/0116504 | A1* | 4/2019 | Rusackas | H04L 41/0253 |

* cited by examiner

WIRELESS ROUTER DEPLOYMENT

FIELD OF THE DESCRIBED EMBODIMENTS

The described embodiments relate generally to wireless communications. More particularly, the described embodiments relate to systems, methods, and apparatuses for deployment of wireless routers into a wireless mesh network.

BACKGROUND

Wireless mesh networks include wireless routers communicating with each other. Typically, the wireless routers communicate according to a wireless mesh network topology. The wireless routers are manually configured one by one typically in a staging area before being deployed. The manual configuration includes installing an operational configuration and profile. This manual process can be inefficient when deploying a large number of wireless routers, costing time and money.

It is desirable to have methods, systems, and apparatuses for more efficiently deploying wireless routers into a wireless mesh network.

SUMMARY

An embodiment includes a method of a wireless router. The method includes accessing, by the wireless router, default credentials, checking, by the wireless router, access to a backhaul link to an upstream network, authenticating, by the wireless router, using the default credentials, procuring, by the wireless router, a customer certificate of a customer, authenticating, by the wireless router, with an authentication server using the customer certificate, procuring, by the wireless router, from a management server, a customer specific wireless mesh configuration after being authenticated by the authentication server, rebooting, by the wireless router, using the customer specific wireless mesh configuration, thereby allowing the wireless router to operate within a wireless mesh network, and broadcasting, by the wireless router, service set identifiers (SSIDs) derived from the default credentials.

For an embodiment, the checking of access to the backhaul link to an upstream network indicates no access to the backhaul link, and the method further includes searching, by the wireless router, for reception of a specific SSID (service set identifier), associating, by the wireless router, with an upstream router that broadcast the specific SSID and provides access to the backhaul link, wherein the authenticating, by the wireless router, using the default credentials is executed after associating with the upstream router.

An embodiment includes a wireless router. The wireless router includes one or more wireless radios and a controller. The controller operates to access default credentials, check access to a backhaul link to an upstream network, authenticate the wireless router using the default credentials, procure a customer certificate, authenticate the wireless router with an authentication server using the customer certificate, procure from a management server, a customer specific wireless mesh configuration after being authenticated by the authentication server, reboot the wireless router using the customer specific wireless mesh configuration, wherein SSID(s) derived from the default credentials are broadcast though the one or more wireless radios.

Other aspects and advantages of the described implementations will become apparent from the following detailed description, taken in conjunction with the accompanying drawings, illustrating by way of example the principles of the described implementations.

DETAILED DESCRIPTION

At least some embodiments provide efficient deployment of wireless routers. For at least some embodiments, each wireless router is issued a birth certificate (as a part of default credentials) by a manufacturer of the wireless routers. Deployment of each of the wireless routers includes power up the wireless router. For an embodiment, the default credentials include the birth certificate and a customer root certificate. In cryptography and computer security, a root certificate is a public key certificate that identifies a root certificate authority (CA).

For an embodiment, the wireless router operates as a gateway if a backhaul connection is available to the wireless router upon powering up the wireless router. For an embodiment, when operating as a gateway the wireless router then authenticates its birth certificate with an authentication server, and then the wireless router has access to the backhaul network. For an embodiment, the wireless router then obtains an operational certificate (customer certificate) from a customer Certificate Authority (CA) server, wherein the operational certificate replaces the birth certificate. The wireless router then obtains an operational profile (customer specific wireless mesh configuration) from a network management server (NMS). For an embodiment, the wireless router then reboots itself using the operational profile, thereby allowing the wireless router to operate as a part of the wireless mesh network. Operating as a gateway, the wireless router then broadcasts a special SSID (service set identifier) to allow other wireless routers to join the wireless mesh network through reception of the special SSIDs.

For an embodiment, if the wireless router is unable to access the backhaul connection, the wireless router does not operate as a gateway, but operates as a wireless access node within the wireless mesh network. Upon determining that the backhaul connection is not available, for at least some embodiments, the wireless router scans for reception the special SSIDs from another wireless router that is operating as a gateway or as an upstream access node. In this embodiment, the gateway of the upstream access node is operating as an authenticator. The wireless router then associates with the gateway of the upstream access node. For at least some embodiments, the wireless router then authenticates its birth certificate with an authentication server through the gateway or the upstream server, and then has access to the backhaul network. For an embodiment, the wireless router then obtains an operational certificate (customer certificate) from a customer Certificate Authority (CA) server which replaces the birth certificate. The wireless router then obtains an operational profile (customer specific wireless mesh configuration) from a network management server (NMS). For an embodiment, the wireless router then reboots itself using the operational profile, thereby allowing the wireless router to operate as a part of the wireless mesh network. Operating as an access node, the wireless router then broadcasts a special SSID (service set identifier) to allow other access nodes to join the wireless mesh network through reception of the special SSIDs.

Figure 1:
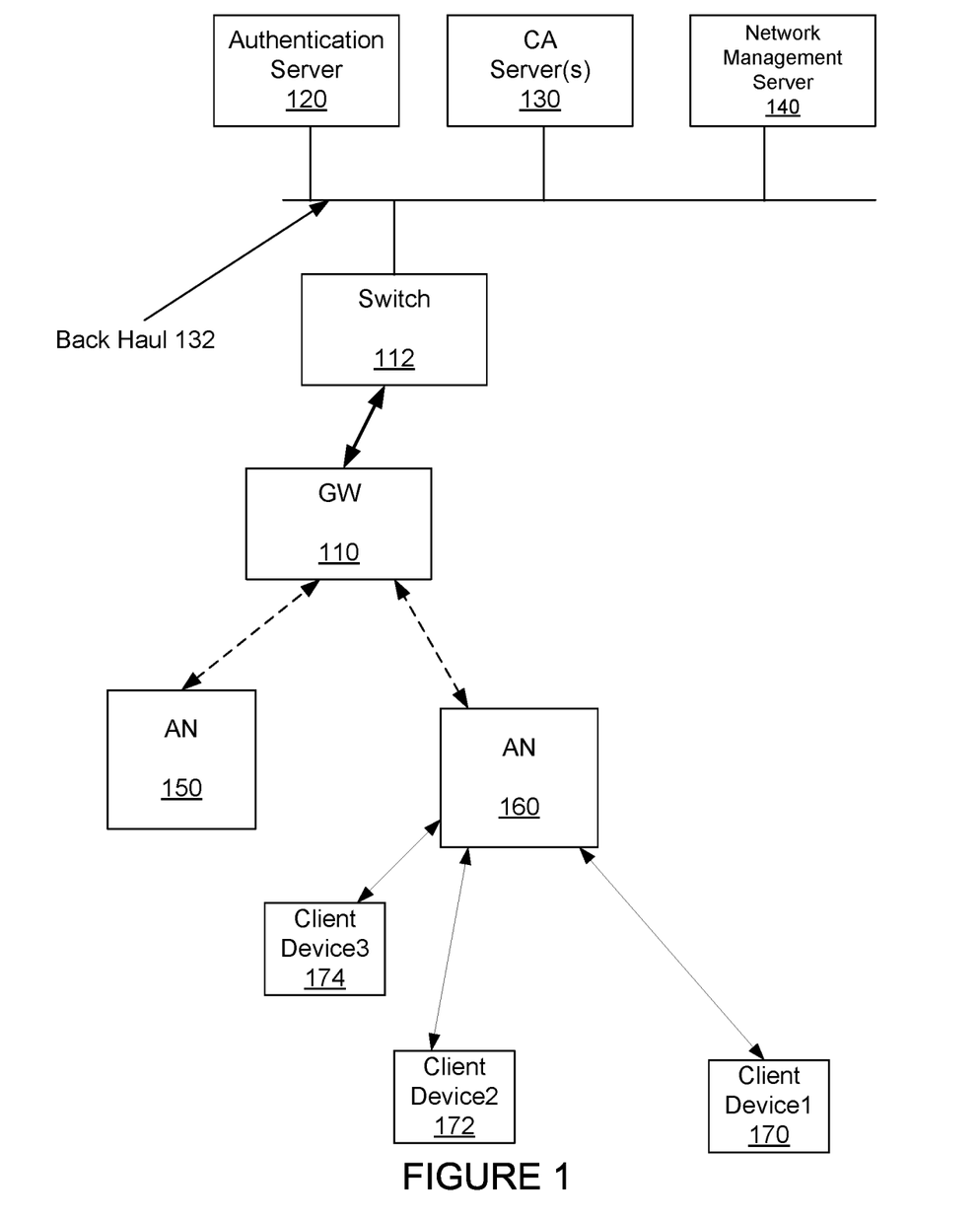
FIG. 1 shows a wireless mesh network, according to an embodiment.

FIG. 1 shows a wireless mesh network, according to an embodiment. As shown, a gateway (wireless router) 110 is connected through a switch 112 (for example via 802.1x switch) to a backhaul link 132, to an authentication server 120, a Certificate Authority (CA) Server 130, and a Network Management Server (NMS) 140. Further, as shown, wireless access nodes (wireless routers) 150, 160 are wirelessly connected to the gateway 110. The gateway 110 provides a connection between the wireless access nodes 150, 160 and the wired network (backhaul 132). Further, the wireless access nodes 150, 160 provide client devices 170, 172, 174 with a connection path to the wired network through the wireless access nodes 150, 160 and the gateway 110.

For at least some embodiments, the wireless routers operate in a bootstrapping mode and a normal operating mesh mode. During the bootstrapping mode the wireless router establishes whether it is to operate as a gateway (like gateway 110) or as a wireless access node (like wireless access nodes 150, 160). Further, during the bootstrapping mode the wireless router obtains a customer certificate of a customer and a customer specific wireless mesh configuration. The wireless router then uses the customer certificate to authenticate with the wireless mesh network, and uses the customer specific wireless mesh configuration to allow the wireless router to operate within the wireless mesh network. During the bootstrapping mode the wireless router joins the wireless mesh network and does not operate to connect client devices to the wireless mesh network. As will be described, downstream devices and client devices can connect to the wireless router once the wireless router transitions (for example, by rebooting) to the normal wireless mesh operation mode. For an embodiment, the wireless router triggers the rebooting based upon obtaining the customer specific wireless mesh configuration.

For at least some embodiments, the normal wireless mesh operation mode of the wireless router occurs after procuring the customer specific wireless mesh configuration and rebooting of the wireless router, and during the normal operation mode the wireless router broadcasts the SSIDs and is operable to connect downstream access nodes and client devices to the wireless mesh network.

Figure 2:
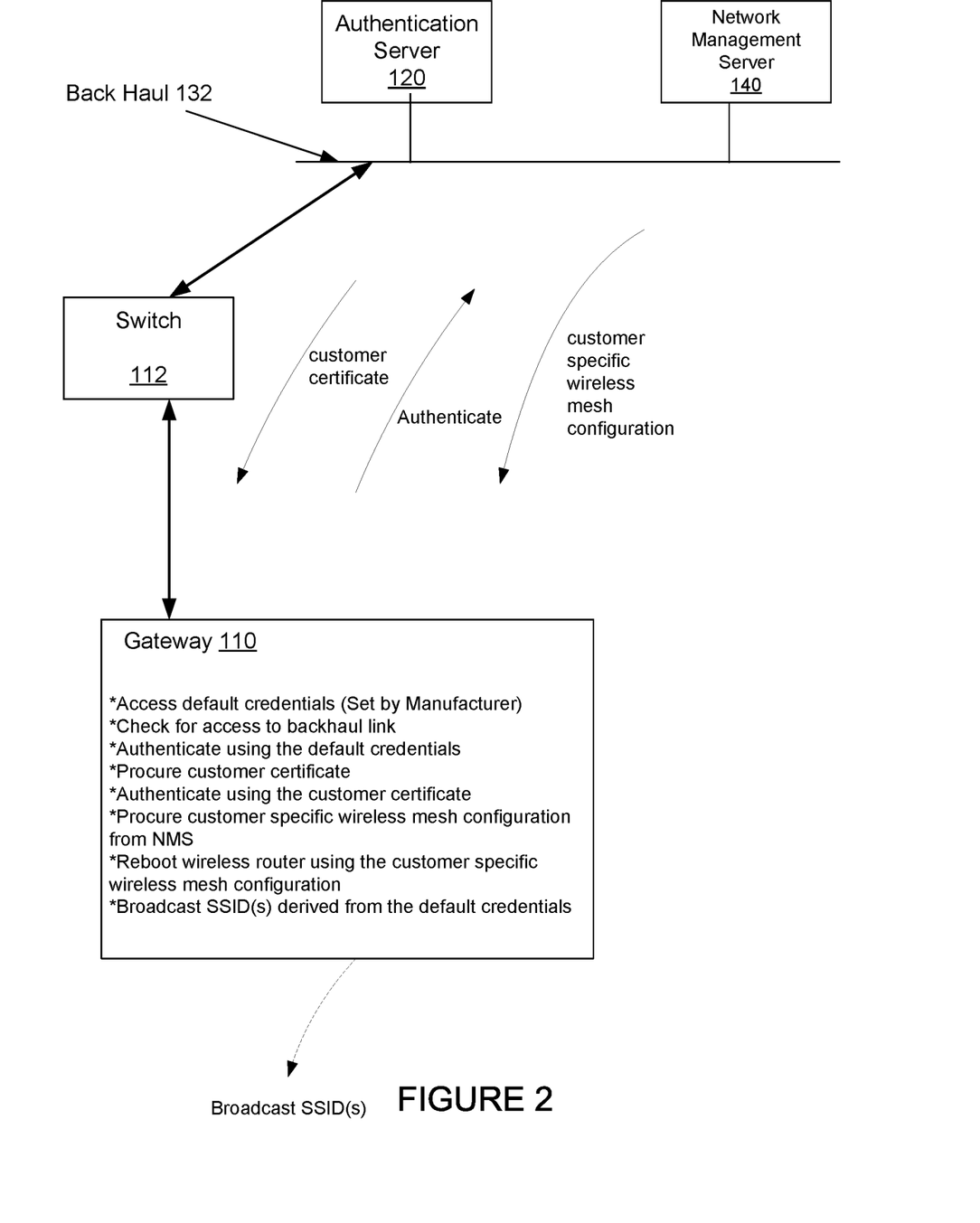
FIG. 2 shows a wireless mesh network that includes deployment of a wireless router that operates as a gateway, according to an embodiment.

FIG. 2 shows a wireless mesh network that includes deployment of a wireless router that operates as a gateway 110, according to an embodiment. As described, for an embodiment, when a wireless router is provided with access to a backhaul link 132 to an upstream network upon powering up during deployment, the wireless router is configured to operate as a gateway 110.

Upon powering up, the wireless router accesses default credentials. For an embodiment, the default credentials are preset and stored in the wireless router during the manufacturing of the wireless router. For an embodiment, the default credentials of the wireless router are preset before deployment of the wireless router, and the default credentials are replaced with the customer credentials before the wireless router operates within the wireless mesh network. For an embodiment, the default credentials include a birth certificate issued by a manufacturer, and a root CA (certificate authority) certificate issued by the customer.

Further, as described, for an embodiment, after powering up the wireless router, the wireless router checks access to a backhaul link to an upstream network. For an embodiment, this includes the wireless router checking if the backhaul connection (link) is present. For an embodiment, checking for backhaul access includes checking for a presence of an Ethernet backhaul link. For an embodiment, after checking for the presence of the Ethernet backhaul link, the wireless router operates as a gateway 110 if the presence of the Ethernet backhaul link is detected. Operating as a gateway in the normal mesh network mode includes providing wireless access to the wireless mesh network to downstream wireless access nodes and client devices. Further, for an embodiment, the wireless router (gateway) performs authentication through an 802.1x wired switch of the customer backhaul network (802.1x switch is the customer 'gate keeper' or authenticator to allow access to the customer's backhaul network).

For an embodiment, the wireless router then authenticates using the default credentials. For an embodiment, authenticating, by the wireless router, using the default credentials includes authenticating an 802.1X birth certificate between the wireless router, an authenticator, and the authentication server 120. For an embodiment when the wireless router operating as a gateway then the 802.1x switch is the authenticator. For an embodiment when a wireless router is acting as wireless access node then the upstream access node or the gateway in normal operating mesh mode act as the authenticator. For an embodiment, authenticating using the default credentials includes the wireless router presenting the 802.1X birth certificate to the authentication server through the authenticator, and the authentication server providing the wireless router with the customer certificate. For an embodiment, the authenticator acts as a relay between the wireless router and the authentication server. For an embodiment, the authenticator also allows access to the network upon successful authentication.

For an embodiment, the wireless router then procures a customer certificate from the customer Certificate Authority (CA) server 130. For an embodiment, procuring, by the wireless router, the customer certificate includes the wireless router procuring digital certificates issued by the customer for a certain validity time using a standard protocol. The certificate validity time indicates a period of time in which the certificate is valid.

For an embodiment, the wireless router then authenticates with an authentication server using the customer certificate.

For an embodiment, the wireless router then procures from the network management server 140, a customer specific wireless mesh configuration after being authenticated by the authentication server 120. For an embodiment, procuring, by the wireless router, from the network management server, the customer specific wireless mesh configuration after being authenticated by the authentication server includes the wireless router connecting to the network management server 140 using the customer certificate, and once authenticated, the network management server 140 downloading the customer specific wireless mesh configuration to allow the wireless router to operate within the wireless mesh network. For an embodiment the wireless mesh configuration can include a meshID, a radio channel number, and/or IP addresses of router.

After procuring the customer specific wireless mesh configuration, for an embodiment, the wireless router reboots using the customer specific wireless mesh configuration as specified by the customer, thereby allowing the wireless router to operate within a wireless mesh network. For an embodiment rebooting the wireless router transitions the wireless router from the bootstrapping mode to the normal mesh operating mode.

Finally, once operating in the normal mesh operating mode within the wireless mesh network, the wireless router (gateway 110) broadcasts service set identifiers (SSIDs) derived from the default credentials. The broadcast SSIDs can be received by other wireless routers, allowing the other wireless routers to also connect into the wireless mesh network.

Figure 3:
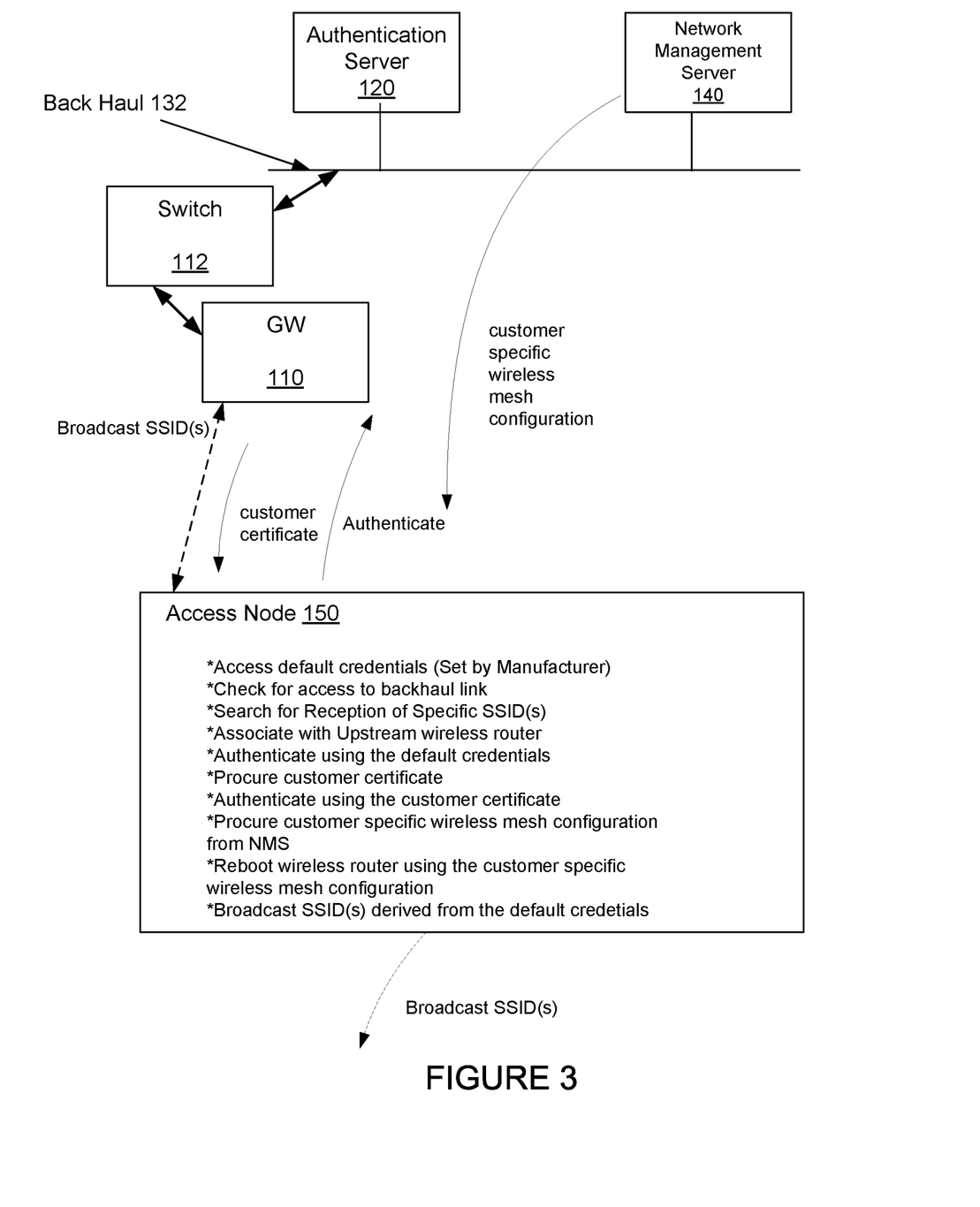
FIG. 3 shows a wireless mesh network that includes deployment of a wireless router that operates as a wireless access node, according to an embodiment.

FIG. 3 shows a wireless mesh network that includes deployment of a wireless router that operates as a wireless access node 150, according to an embodiment.

Similar to the description of FIG. 2, upon powering up the wireless router accesses default credentials. For an embodiment, the default credentials are preset and stored in the wireless router. For an embodiment, the default credentials of the wireless router are preset before deployment of the wireless router, and the default credentials are replaced with the customer credentials before the wireless router operates within the wireless mesh network. For an embodiment, the default credentials include a birth certificate issued by a manufacturer, and a root CA (certificate authority) certificate issued by the customer.

Further, as described, for an embodiment, after powering up the wireless router, the wireless router checks access to a backhaul link to an upstream network. For an embodiment, this includes the wireless router checking if the backhaul connection is present. For an embodiment, checking for backhaul access includes checking for a presence of an Ethernet backhaul link. For an embodiment, after checking for the presence of the Ethernet backhaul link, the wireless router operates as a wireless access node 150 if the presence of the Ethernet backhaul link is not detected. Operating as a wireless access node includes providing wireless access to the wireless mesh network through an upstream gateway or an upstream wireless access node to downstream wireless access nodes and/or client devices.

Once the wireless router has been activated or powered up and checking, by the wireless router, access to the backhaul link to an upstream network indicates no access to the backhaul link, for at least some embodiments, the wireless router, searches for reception of a specific SSID (service set identifier). That is, the wireless router initiates connecting to the wireless mesh network by receiving SSIDs from an upstream gateway or upstream wireless access node. As will be described, the SSID(s) are received, for example, through a radio of the wireless router tuning over available channels searching for SSID(s) broadcast from the upstream gateway or the upstream wireless access node.

For at least some embodiments, after receiving the broadcast SSID(s), the wireless router associates with an upstream router (upstream gateway or upstream access node) that broadcast the specific SSID and provides access to the backhaul link.

After associating with the upstream router, for an embodiment, the wireless router then authenticates using the default credentials. For an embodiment, authenticating, by the wireless router, using the default credentials includes authenticating an 802.1X birth certificate between the wireless router, an authenticator, and the authentication server 120. For an embodiment, authenticating using the default credentials includes the wireless router presenting the 802.1X birth certificate to the authentication server through the authenticator, and the authentication server providing the wireless router with the customer certificate. For an embodiment when a wireless router is acting as wireless access node then the upstream access node or the gateway in normal operating mesh mode act as the authenticator. For an embodiment, authenticating using the default credentials includes the wireless router presenting the 802.1X birth certificate to the authentication server through the authenticator, and the authentication server providing the wireless router with the customer certificate.

For an embodiment, the wireless router then procures a customer certificate from the customer Certificate Authority (CA) server 130. For an embodiment, procuring, by the wireless router, the customer certificate includes the wireless router procuring digital certificates issued by the customer for a certain validity time using a standard protocol. The certificate validity time indicates a period of time in which the certificate is valid.

For an embodiment, the wireless router then authenticates with an authentication server using the customer certificate. For an embodiment, authenticating, by the wireless router, with the authentication server using the customer certificate includes authenticating a customer issued 802.1x certificate.

For an embodiment, the wireless router then procures from a network management server 140, a customer specific wireless mesh configuration after being authenticated by the authentication server 120. For an embodiment, procuring, by the wireless router, from the network management server, the customer specific wireless mesh configuration after being authenticated by the authentication server includes the wireless router connecting to the network management server 140 using the customer certificate, and once authenticated, the network management server 140 downloads the customer specific wireless mesh configuration to allow the wireless router to operate within the wireless mesh network. For an embodiment the wireless mesh configuration can include a meshID, a radio channel number, and/or IP addresses of router.

Similar to as described for FIG. 2, after procuring the customer specific wireless mesh configuration, for an embodiment, the wireless router reboots using the customer specific wireless mesh configuration as specified by the customer, thereby allowing the wireless router to operate within a wireless mesh network. For an embodiment rebooting the wireless router transitions the wireless router from the bootstrapping mode to the normal mesh operating mode.

Finally, once operating within the wireless mesh network, the wireless router (wireless access node 150) broadcasts service set identifiers (SSIDs) derived from the default credentials. The broadcast SSIDs can be received by other wireless routers, allowing the other wireless routers to also connect into the wireless mesh network.

Figure 4:
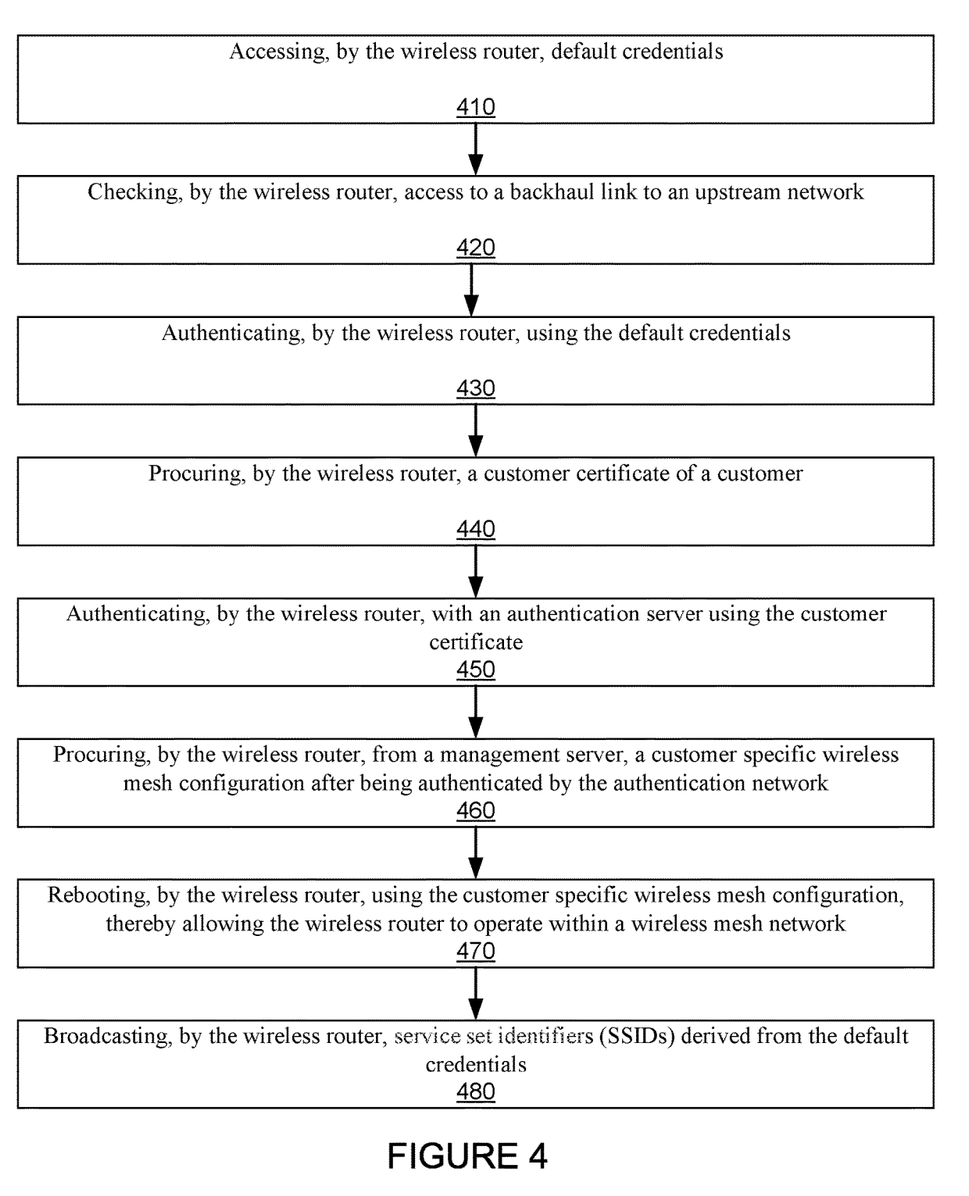
FIG. 4 is a flow chart that includes steps of a method of operating a wireless router, according to an embodiment.

FIG. 4 is a flow chart that includes steps of a method of operating a wireless router, according to an embodiment. A first step 410 includes accessing, by the wireless router, default credentials. A second step 420 includes checking, by the wireless router, access to a backhaul link to an upstream network. A third step 430 includes authenticating, by the wireless router, using the default credentials. A fourth step 440 includes procuring, by the wireless router, a customer certificate of a customer. A firth step 450 includes authenticating, by the wireless router, with an authentication server using the customer certificate. A sixth step 460 includes procuring, by the wireless router, from a management server, a customer specific wireless mesh configuration after being authenticated by the authentication server. A seventh step 470 includes rebooting, by the wireless router, using the customer specific wireless mesh configuration, thereby allowing the wireless router to operate within a wireless mesh network. An eighth step 480 includes broadcasting, by the wireless router, service set identifiers (SSIDs) derived from the default credentials.

For at least some embodiments, the wireless router operates in a bootstrapping mode and a normal operating mesh mode. For an embodiment, during the bootstrapping mode the wireless router obtains the customer certificate of the customer and the customer specific wireless mesh configuration. For an embodiment, the normal operation mode occurs after procuring the customer specific wireless mesh configuration, and wherein during the normal operation mode the wireless router broadcasts the SSIDs and is operable to connect client devices to the wireless mesh network.

As previously described, during the bootstrapping mode the wireless router establishes whether it is to operate as a gateway (like gateway 110) or as a wireless access node (like wireless access nodes 150, 160). Further, during the bootstrapping mode the wireless router obtains a customer certificate of a customer and a customer specific wireless mesh configuration. The wireless router then uses the customer certificate to authenticate with the wireless mesh network, and uses the customer specific wireless mesh configuration to allow the wireless router to operate within the wireless mesh network. During the bootstrapping mode the wireless router joins the wireless mesh network and does not operate to connect client devices to the wireless mesh network. As will be described, downstream devices and client devices can connect to the wireless router once the wireless router transitions (for example, by rebooting) to the normal wireless mesh operation mode.

Further, as previously described, for at least some embodiments, the normal wireless mesh operation mode of the wireless router occurs after procuring the customer specific wireless mesh configuration, and during the normal operation mode the wireless router broadcasts the SSIDs and is operable to connect downstream access nodes and client devices to the wireless mesh network.

For at least some embodiments, the default credentials of the wireless router are preset before deployment of the wireless router, and the birth certificate portion of the default credentials is replaced with the customer credentials before the wireless router operates within the wireless mesh network. For at least some embodiments, the default credentials include a birth certificate issued by a manufacturer, and a CA (certificate authority) certificate issued by the customer. At least some embodiments include the wireless router accessing default credentials upon powering up, the wireless router accesses default credentials.

Further, as described, for an embodiment, after powering up the wireless router, the wireless router checks access to a backhaul link to an upstream network. For an embodiment, this includes the wireless router checking if the backhaul connection is present. For an embodiment, checking for backhaul access includes checking for a presence of an Ethernet backhaul link. For an embodiment, after checking for the presence of the Ethernet backhaul link, the wireless router operates as a gateway 110 if the presence of the Ethernet backhaul link is detected. Operating as a gateway in the normal mesh network mode includes providing wireless access to the wireless mesh network to downstream wireless access nodes and client devices. Further, for an embodiment, the wireless router (gateway) performs authentication through an 802.1x wired switch of the customer backhaul network (802.1x switch is the customer 'gate keeper' or authenticator to allow access to the customer's backhaul network).

For at least some embodiments, after checking for the presence of the backhaul link (Ethernet backhaul link), the wireless router operates as a gateway if the presence of the Ethernet backhaul link is detected, and wherein the wireless router operating as a gateway includes the wireless router operating in a normal mesh network mode that includes providing wireless access to the wireless mesh network to downstream wireless access nodes and client devices.

For at least some embodiments, after checking for the presence of the Ethernet backhaul link, if the backhaul link is not present then the wireless router operates as a wireless access node, and the wireless access node is authenticated through an upstream wireless router that is transmitting upstream SSIDs.

As previously described, for an embodiment, the wireless router then authenticates using the default credentials. For an embodiment, authenticating, by the wireless router, using the default credentials includes authenticating an 802.1X birth certificate between the wireless router, an authenticator, and the authentication server 120. For an embodiment when the wireless router operating as a gateway then the 802.1x switch is the authenticator. For an embodiment when a wireless router is acting as wireless access node then the upstream access node or the gateway in normal operating mesh mode act as the authenticator. For an embodiment, authenticating using the default credentials includes the wireless router presenting the 802.1X birth certificate to the authentication server through the authenticator, and the authentication server providing the wireless router with the customer certificate.

For at least some embodiments, procuring, by the wireless router, the customer certificate includes the wireless router procuring digital certificates issued by the customer for a certificate validity time using a standard protocol, wherein the certificate validity time indicates a period of time in which the customer certificate is valid. The certificate validity time indicates a period of time in which the certificate is valid.

For at least some embodiments, authenticating, by the wireless router, with the authentication server using the customer certificate comprises authenticating a customer issued 802.1x certificate.

For at least some embodiments, procuring, by the wireless router, from the management server, the customer specific configuration after being authenticated by the authentication server comprises the wireless router connecting to the management server using the customer certificate, and once authenticated, the management server downloading the customer specific wireless mesh configuration to allow the wireless router to operate within the wireless mesh network. For an embodiment the wireless mesh configuration can include a meshID, a radio channel number, and/or IP addresses of router.

For at least some embodiments, searching, by the wireless router, for reception of the specific SSID includes the wireless router scanning wireless channels searching for reception of the specific SSID from upstream wireless routers. For at least some embodiments, scanning the wireless channels includes a radio of the wireless router tuning through channels of the radio searching for reception of the specific SSID from upstream wireless routers.

Figure 5:
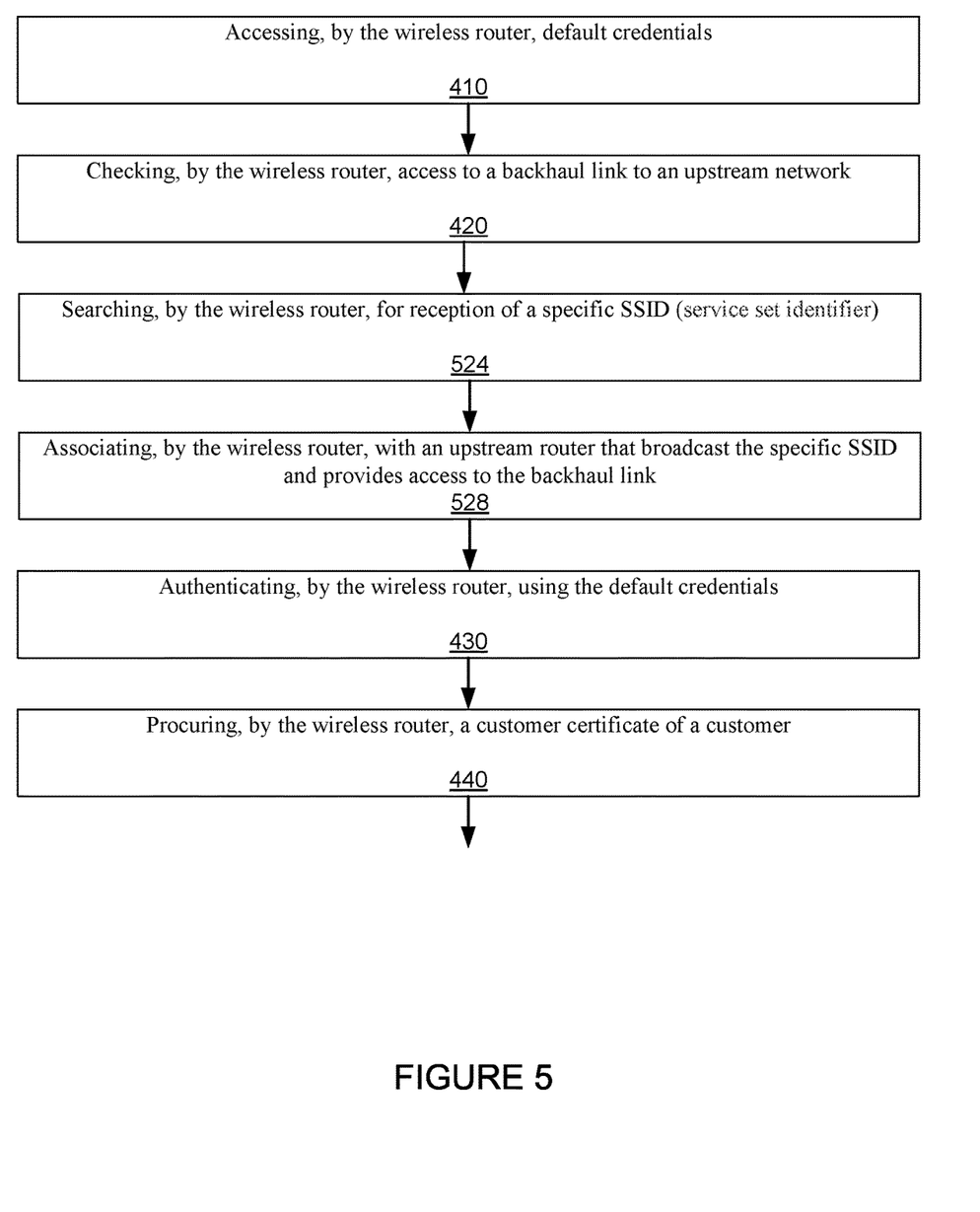
FIG. 5 is a flow chart that includes steps of a method of operating a wireless router, according to another embodiment.

FIG. 5 is a flow chart that includes steps of a method of operating a wireless router, according to another embodiment. As previously described, if the wireless router is able to obtain access to the backhaul link, the wireless router operates as a gateway after rebooting. However, if the wireless router is unable to access the backhaul link, for at least some embodiments, the wireless router operates as an access node after rebooting. That is, for at least some embodiments, the checking, by the wireless router, access to the backhaul link to an upstream network indicates no access to the backhaul link, and steps of FIG. 5 are performed.

Initial steps are the same as for FIG. 4. Specifically, a first step 410 includes accessing, by the wireless router, default credentials. A second step 420 includes checking, by the wireless router, access to a backhaul link to an upstream network.

Upon determining that a backhaul link is not available, step 524 includes searching, by the wireless router, for reception of a specific SSID (service set identifier). A step 528 includes associating, by the wireless router, with an upstream router that broadcast the specific SSID and provides access to the backhaul link, wherein the authenticating, by the wireless router, using the default credentials is executed after associating with the upstream router.

Subsequent steps are similar to FIG. 4. More specifically, the subsequent steps include step 430 which includes authenticating, by the wireless router, using the default credentials. A step 440 includes procuring, by the wireless router, a customer certificate of a customer. A step 450 (not shown in FIG. 5) includes authenticating, by the wireless router, with an authentication server using the customer certificate. A step 460 (not shown in FIG. 5) includes procuring, by the wireless router, from a management server, a customer specific wireless mesh configuration after being authenticated by the authentication server. A step 470 (not shown in FIG. 5) includes rebooting, by the wireless router, using the customer specific wireless mesh configuration, thereby allowing the wireless router to operate within a wireless mesh network. A step 480 (not shown in FIG. 5) includes broadcasting, by the wireless router, service set identifiers (SSIDs) derived from the default credentials.

Figure 6:
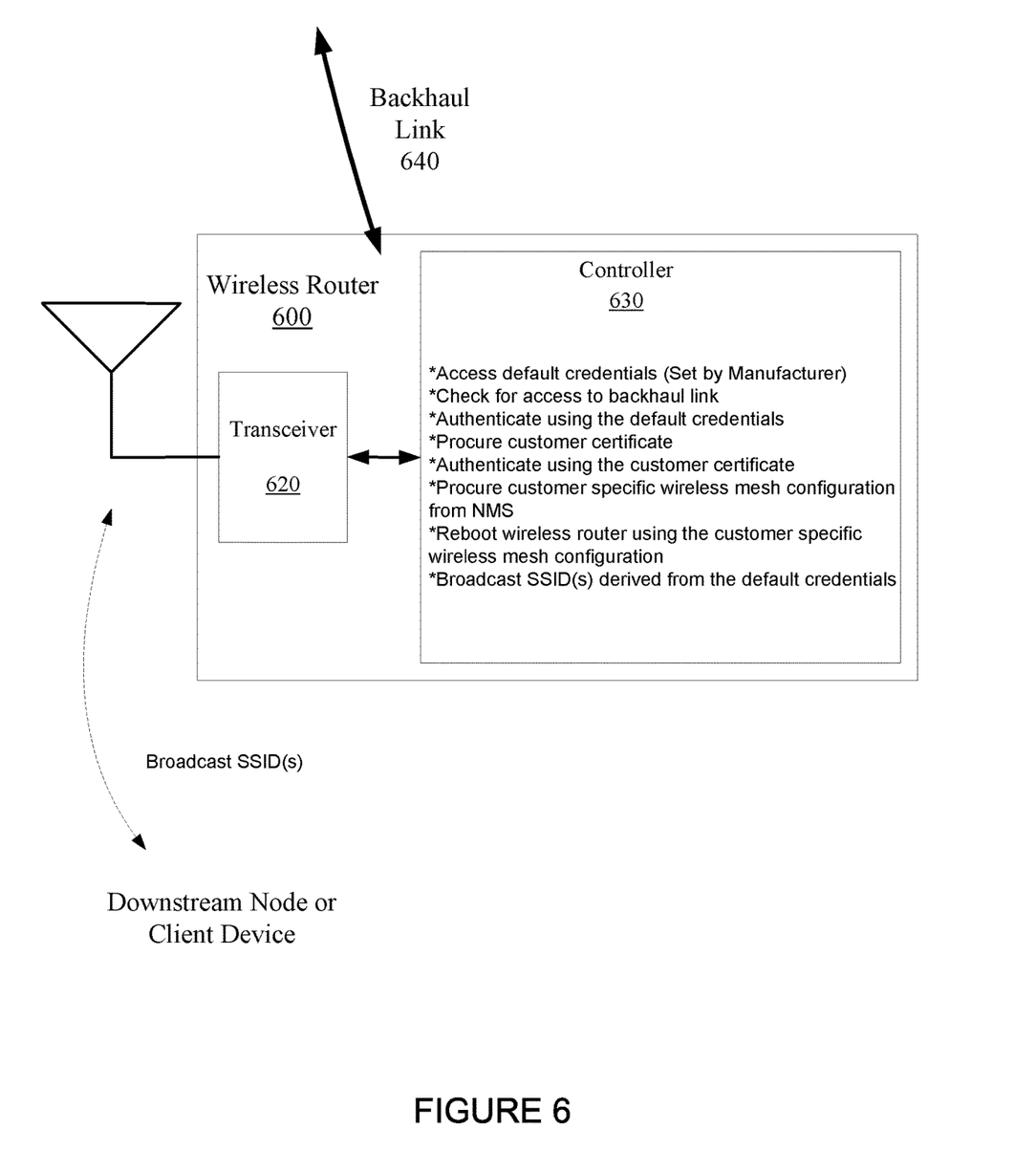
FIG. 6 shows a block diagram of an example wireless router, according to an embodiment.

FIG. 6 shows a block diagram of an example wireless router 600, according to an embodiment. The wireless router 600 includes a transceiver 620 and a controller 630. For this embodiment, the wireless router 600 operates to identify a backhaul link 640. For at least some embodiments, the controller 630 operates to access default credentials, check access to the backhaul link 640 to an upstream network, authenticate the wireless router 600 using the default credentials, procure a customer certificate, authenticate the wireless router 600 with an authentication server using the customer certificate, procure from a management server, a customer specific wireless mesh configuration after being authenticated by the authentication server, and reboot the wireless router 600 using the customer specific wireless mesh configuration, wherein SSID(s) derived from the default credentials are broadcast though the one or more wireless radios (such as, transceiver 620).

Figure 7:
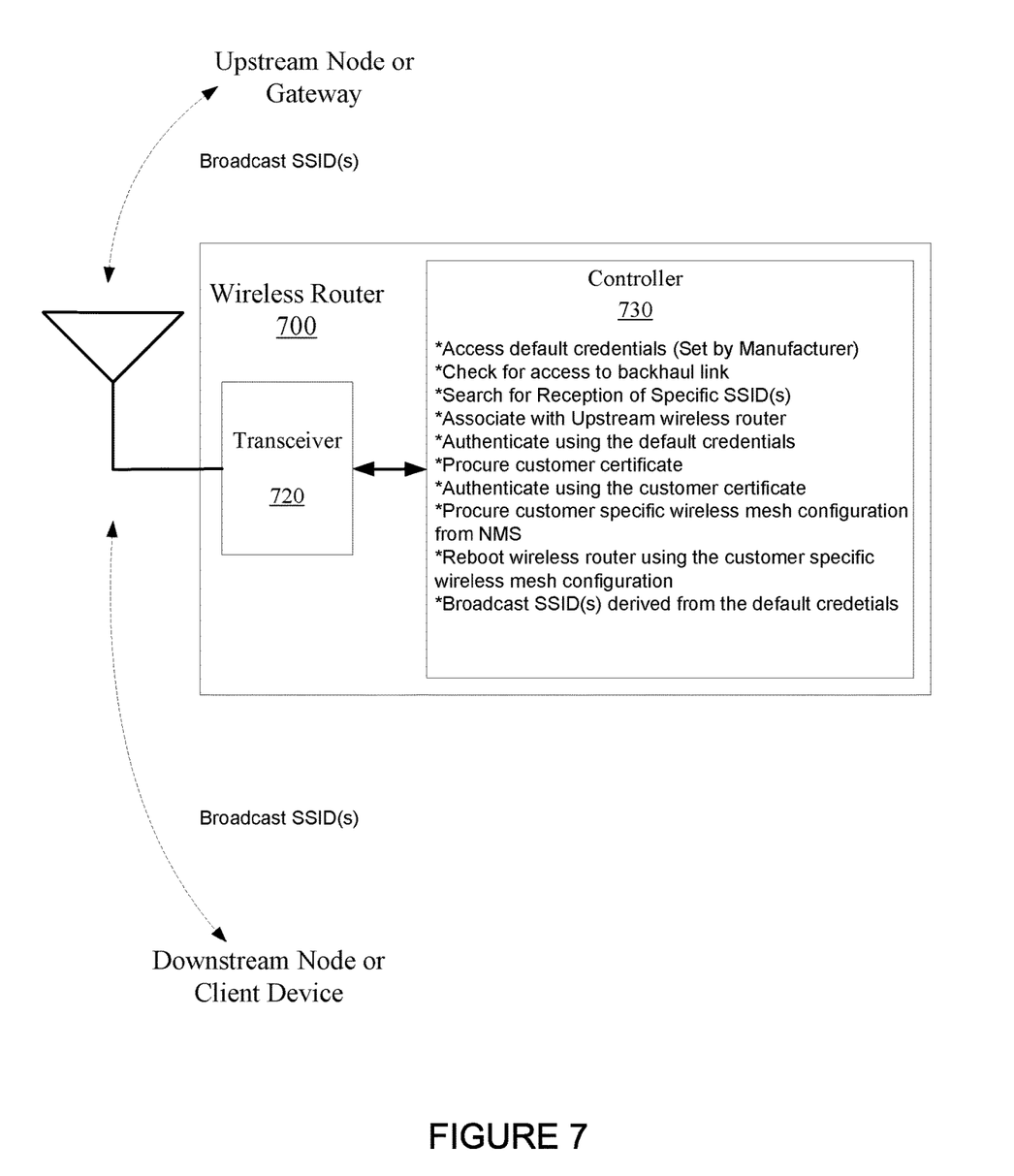
FIG. 7 shows a block diagram of an example wireless router, according to another embodiment.

FIG. 7 shows a block diagram of an example wireless router 700, according to another embodiment. For this embodiment, the wireless router 700 operates to identify that the wireless router 700 does not have a backhaul link. The transceiver 720 of the wireless router then operates to receive SSID(s) from an upstream access node or gateway. For at least some embodiments, the controller 730 operates to access default credentials, check access to the backhaul link 640 to an upstream network (which is not found), search for reception of specific SSID(s) through the transceiver 720 after determining the backhaul 640 is not available, associate with an upstream router, authenticate the wireless router 700 using the default credentials, procure a customer certificate, authenticate the wireless router 700 with an authentication server using the customer certificate, procure from a management server, a customer specific wireless mesh configuration after being authenticated by the authentication server, and reboot the wireless router 700 using the customer specific wireless mesh configuration, wherein SSID(s) derived from the default credentials are broadcast though the one or more wireless radios (such as, transceiver 720).

Although specific embodiments have been described and illustrated, the embodiments are not to be limited to the specific forms or arrangements of parts so described and illustrated.

What is claimed:

1. A method of a wireless router, comprising:
    accessing, by the wireless router, default credentials, wherein the default credentials include a birth certificate, wherein the birth certificate was issued by a manufacturer of the wireless router;
    checking, by the wireless router, access to a backhaul link to an upstream network;
    authenticating, by the wireless router, using the default credentials;
    procuring, by the wireless router, from a CA (Certificate Authority) server, a customer certificate of a customer comprising the wireless router procuring digital certificates issued by the customer for a certificate validity time using a standard protocol;
    replacing, by the wireless router, the birth certificate with the customer certificate;
    authenticating, by the wireless router, with an authentication server using the customer certificate;
    procuring, by the wireless router, from a management server, a customer specific wireless mesh configuration after being authenticated by the authentication server, comprising the wireless router connecting to the management server using the customer certificate, and once authenticated, the management server downloading the customer specific wireless mesh configuration to allow the wireless router to operate within the wireless mesh network, wherein the customer specific wireless mesh configuration comprises at least a mesh ID, a radio channel number, and IP addresses of the wireless router;
    rebooting, by the wireless router, using the customer specific wireless mesh configuration, thereby allowing the wireless router to operate within a wireless mesh network, wherein the rebooting is triggered upon obtaining the customer specific wireless mesh configuration; and
    broadcasting, by the wireless router, service set identifiers (SSIDs) derived from the default credentials.

2. The method of claim 1, wherein the wireless router operates in a bootstrapping mode and a normal operating mesh mode,
    wherein during the bootstrapping mode the wireless router obtains the customer certificate of the customer and the customer specific wireless mesh configuration;
    wherein the normal operation mode occurs after procuring the customer specific wireless mesh configuration, and wherein during the normal operation mode the wireless router broadcasts the SSIDs and is operable to connect client devices to the wireless mesh network.

3. The method of claim 1, wherein the checking, by the wireless router, access to the backhaul link to an upstream network indicates no access to the backhaul link, and further comprising:
  searching, by the wireless router, for reception of a specific SSID (service set identifier);
  associating, by the wireless router, with an upstream router that broadcast the specific SSID and provides access to the backhaul link; wherein
  the authenticating, by the wireless router, using the default credentials is executed after associating with the upstream router.

4. The method of claim 3, wherein searching, by the wireless router, for reception of the specific SSID comprises the wireless router scanning wireless channels searching for reception of the specific SSID from upstream wireless routers.

5. The method of claim 1, wherein the default credentials of the wireless router are preset before deployment of the wireless router.

6. The method of claim 1, wherein checking for backhaul access comprises checking for a presence of an Ethernet backhaul link.

7. The method of claim 6, wherein after checking for the presence of the Ethernet backhaul link, the wireless router operates as a gateway if the presence of the Ethernet backhaul link is detected, and wherein the wireless router operating as a gateway includes the wireless router operating in a normal mesh network mode that includes providing wireless access to the wireless mesh network to downstream wireless access nodes and client devices.

8. The method of claim 6, wherein after checking for the presence of the Ethernet backhaul link, if the backhaul link is not present then the wireless router operates as a wireless access node, and the wireless access node is authenticated through an upstream wireless router that is transmitting upstream SSIDs.

9. The method of claim 1, wherein authenticating, by the wireless router, using the default credentials comprises authenticating the birth certificate between the wireless router, an authenticator, and the authentication server.

10. The method of claim 9, wherein authenticating using the default credentials comprises the wireless router presenting the birth certificate to the authentication server through the authenticator, and the authentication server providing the wireless router with the customer certificate.

11. The method of claim 1, authenticating, by the wireless router, with the authentication server using the customer certificate comprises authenticating a customer issued 802.1x certificate.

12. A wireless router, comprising:
  one or more wireless radios;
  a controller, wherein the controller operates to:
    access default credentials, wherein the default credentials include a birth certificate, wherein the birth certificate was issued by a manufacturer of the wireless router;
    check access to a backhaul link to an upstream network;
    authenticate the wireless router using the default credentials;
    procure from a CA server, a customer certificate of a customer comprising the wireless router procuring digital certificates issued by the customer for a certificate validity time using a standard protocol;
    replace the birth certificate with the customer certificate;
    authenticate the wireless router with an authentication server using the customer certificate;
    procure from a management server, a customer specific wireless mesh configuration after being authenticated by the authentication server, comprising the wireless router connecting to the management server using the customer certificate, and once authenticated, the management server downloading the customer specific wireless mesh configuration to allow the wireless router to operate within the wireless mesh network, wherein the customer specific wireless mesh configuration comprises at least a meshID, a radio channel number, and IP addresses of the wireless router; and
    reboot the wireless router using the customer specific wireless mesh configuration, wherein the rebooting is triggered upon obtaining the customer specific wireless mesh configuration; and wherein
    SSID(s) derived from the default credentials are broadcast though the one or more wireless radios.

13. The wireless router of claim 12, wherein the wireless router operates in a bootstrapping mode and a normal operating mesh mode,
  wherein during the bootstrapping mode the wireless router obtains the customer certificate of the customer and the customer specific wireless mesh configuration;
  wherein the normal operation mode occurs after procuring the customer specific wireless mesh configuration, and wherein during the normal operation mode the wireless router broadcasts the SSIDs and is operable to connect client devices to the wireless mesh network.

14. The wireless router of claim 12, wherein the checking, by the wireless router, access to the backhaul link to an upstream network indicates no access to the backhaul link, and further comprising:
  searching, by the wireless router, for reception of a specific SSID (service set identifier), wherein searching, by the wireless router, for reception of the specific SSID comprises the wireless router scanning wireless channels searching for reception of the specific SSID from upstream wireless routers;
  associating, by the wireless router, with an upstream router that broadcast the specific SSID and provides access to the backhaul link; wherein
  the authenticating, by the wireless router, using the default credentials is executed after associating with the upstream router.

15. The wireless router of claim 12, wherein checking for backhaul access comprises checking for a presence of an Ethernet backhaul link, wherein after checking for the presence of the Ethernet backhaul link, the wireless router operates as a gateway if the presence of the Ethernet backhaul link is detected, and wherein the wireless router operating as a gateway includes the wireless router operating in a normal mesh network mode that includes providing wireless access to the wireless mesh network to downstream wireless access nodes and client devices.

16. The wireless router of claim 15, wherein after checking for the presence of the Ethernet backhaul link, if the backhaul link is not present then the wireless router operates as a wireless access node, and the wireless access node is authenticated through an upstream wireless router that is transmitting upstream SSIDs.

17. The wireless router of claim 12, wherein authenticating, by the wireless router, using the default credentials comprises authenticating the birth certificate between the wireless router, an authenticator, and the authentication server, wherein authenticating using the default credentials comprises the wireless router presenting the birth certificate to the authentication server through the authenticator, and the authentication server providing the wireless router with the customer certificate.

* * * * *